United States Patent [19]

Palmgren

[11] 4,382,628
[45] May 10, 1983

[54] STAGGERED SEATS IN SEATING UNITS FOR PASSENGER COMPARTMENTS

[75] Inventor: Curtis M. Palmgren, Bellevue, Wash.
[73] Assignee: The Boeing Company, Seattle, Wash.
[21] Appl. No.: 261,111
[22] PCT Filed: Aug. 25, 1980
[86] PCT No.: PCT/US80/01097
§ 371 Date: Aug. 25, 1980
§ 102(e) Date: Aug. 25, 1980
[87] PCT Pub. No.: WO82/00618
PCT Pub. Date: Mar. 4, 1982
[51] Int. Cl.³ .................. A47C 15/00; B64D 11/06
[52] U.S. Cl. ................................ 297/232; 244/118.6; 296/64; 297/411; 297/452
[58] Field of Search .............. 297/411, 232, 452; 296/64, 65 A; 244/118.6; 105/322, 344, 336, 345, 346, 347; 52/8; D6/41, 48

[56] References Cited

U.S. PATENT DOCUMENTS

| 1,039,780 | 10/1912 | Morgan | 296/64 |
| 2,839,312 | 6/1958 | Barenyl et al. | 296/64 X |
| 2,947,349 | 8/1960 | Kryter | 296/64 |
| 3,541,742 | 11/1970 | Harper | 297/232 |
| 3,730,583 | 5/1973 | Colovas et al. | 296/64 |

FOREIGN PATENT DOCUMENTS

| 530506 | 10/1921 | France | 296/64 |
| 1144964 | 4/1957 | France | 296/64 |
| 675636 | 7/1952 | United Kingdom | 296/64 |

Primary Examiner—James T. McCall
Attorney, Agent, or Firm—Nicolaas DeVogel; Bernard A. Donahue

[57] ABSTRACT

A seating unit for a passenger system utilizing rows of seating units applicable to compartments in aircraft, buses or the like. The seating unit has two or more seats wherein each seat is provided with a backrest and an armrest at each seat side so that an armrest between two seats may be shared by adjacent occupants. The seats in a row are mounted next to one another, but are offset or staggered alternately several centimeters with respect to each other, by individual, horizontally spaced pivot assemblies and base frame members for each seat in the unit. The staggered seats and backrests in a multiple unit arrangement provide the occupants with increased shoulder, elbow, and leg space and significantly improve the occupants' comfort and sense of well-being.

2 Claims, 14 Drawing Figures

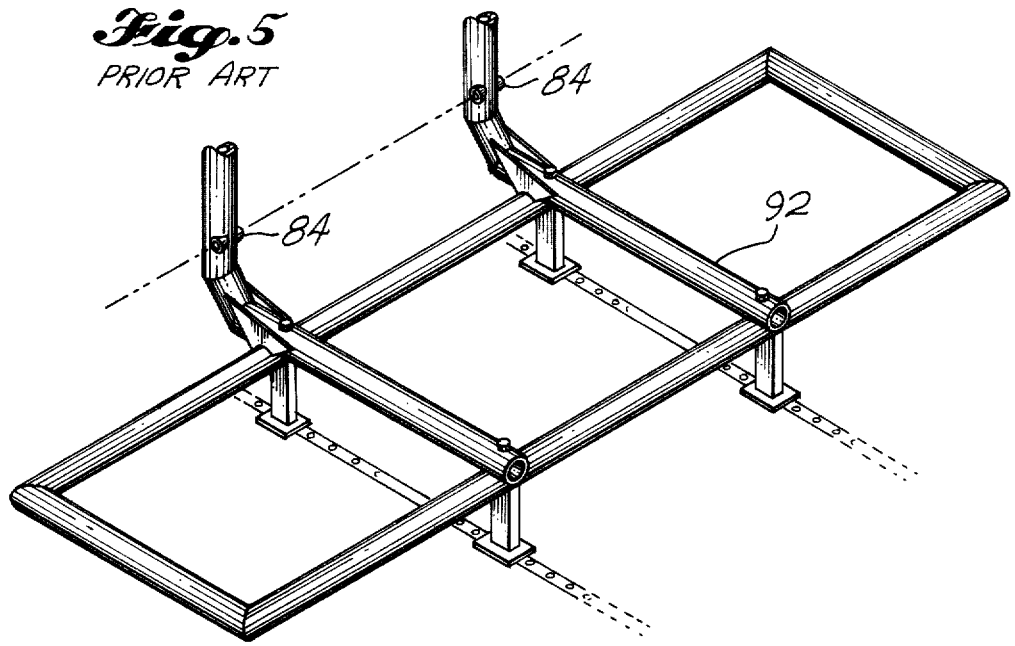
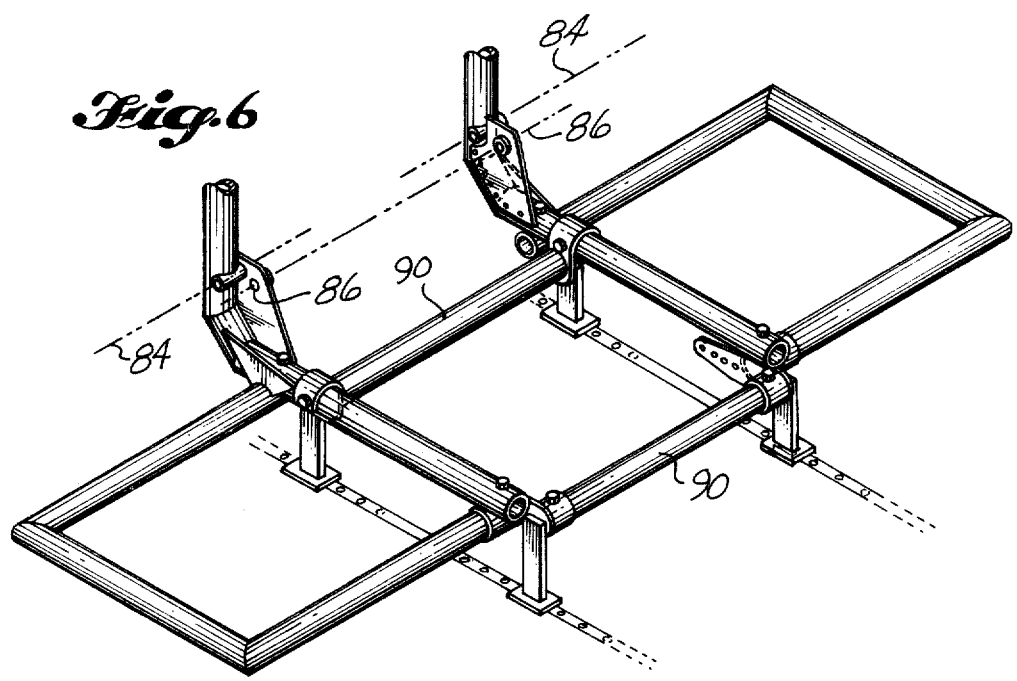

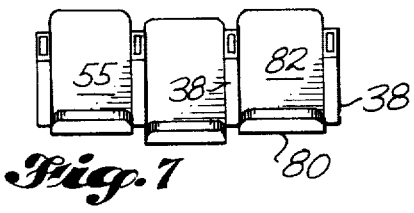
Fig. 7
Fig. 8
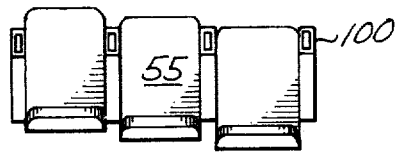
Fig. 9
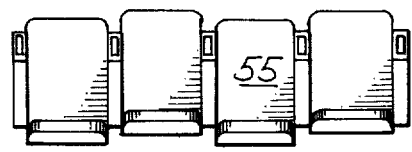
Fig. 10
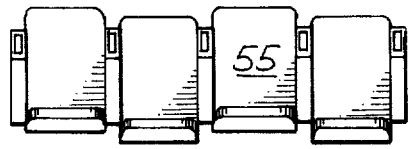
Fig. 11
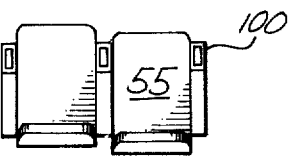
Fig. 12
Fig. 13
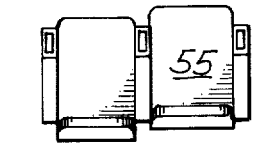
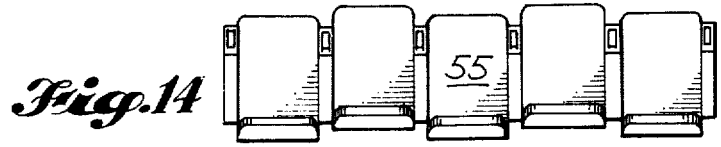
Fig. 14

STAGGERED SEATS IN SEATING UNITS FOR PASSENGER COMPARTMENTS

BACKGROUND OF THE INVENTION

This invention relates to seating units, in particular to a seating unit construction providing for staggered seats for passenger compartments in vehicles such as aircraft, or the like.

A conventional seating unit typically has a frame construction which carries two or more seats each including a seat cushion with an adjustable backrest. An armrest is located on each side of the seat cushion so that one armrest exists between every two adjacent seat cushions. The seating unit of two, three, etc., seats is so constructed that the cushions, armrests and backrests are aligned with one another forming a couch-type arrangement for abreast passenger seating. The units are mounted in floor seat tracks, in rows across the cabin or compartment in a configuration forming one or more longitudinal aisles for passageway and seating access purposes.

In a novelty search the following references of interest were found and are discussed here for further background.

U.S. Pat. No. 87,216, U.S. Pat. No. 338,895, and U.S. Pat. No. 2,981,314 each relate to a single seat or chair which has an adjustable back and moveable seat cushion for conversion into a sofa or into a reclining mode.

U.S. Pat. No. 1,205,775 relates to opposed seats in a train compartment wherein the seats and backrests may slide towards one another so that a bed is formed.

U.S. Pat. No. 1,471,001 and U.S. Pat. No. 1,643,236 relate to a forward car seat which can be moved behind the driver's seat or folded forward to obtain access to the rear compartment of the car.

U.S. Pat. No. 2,271,601 and U.S. Pat. No. 2,883,683 relate to extensions for mattresses and U.S. Pat. No. 2,521,339 relates to an aircraft seat wherein the seat cushion is a parachute.

U.S. Pat. No. 3,910,632 relates to an aircraft seating unit of three seats wherein the center seat may be folded forward for conversion into a table between the seats on each side.

Of particular interest is U.S. Pat. No. 2,051,703 which relates to a front seat arrangement in a small airplane cockpit where the shape and width of the nose or cockpit structure demands a squeezed-in seating layout. The patent teaches a two occupant adjacent seating situation in the nose section of the vehicle where the pilot is positioned forward of the adjacent seat. The arrangement is not related to pitch distance (pitch is legroom distance between seats in forward direction), armrest, legroom, and aisle access considerations.

Also, these prior art situations do not relate to an overall system and layout of a 50-500 passenger airplane seat arrangement where several rows forming 4 to 14 or more abreast seats for passengers, divided by several aisles, are disposed densely together in the most feasible, economic, efficient but uncomfortable mode.

Seating arrangements in aircraft are very important for the aircraft manufacturing industry. Customers or airlines who buy airplanes from the manufacturer are highly interested in the seating arrangements of airplanes since their business demands that the passenger is satisfied in travel and comfort. For instance, a seating arrangement having a six-seat-abreast configuration could be arranged in rows of two seats forming two aisles through the passenger compartment or could be arranged in three-seat rows forming a single aisle between rows in the compartment. It appears that most airlines prefer a two-row aisle configuration since it creates a more spacious looking compartment. Accordingly, it will be understood that an airplane seating arrangement can be very important and that improvements herein may produce a significant change in airplane seat arrangements for the future which will be beneficial to many airlines and passengers.

SUMMARY OF THE INVENTION

Briefly, the present invention avoids the disadvantages and limitations of the prior art discussed above by providing a seating system in which the seating units in a passenger compartment are arranged in rows but staggered back and forth within each row by an increment of a few centimeters.

This offset of the seats in the seating unit is in relationship to the sharing elbowroom for two side-by-side occupants using the same armrest. Furthermore, the invention also involves the arrangement of the seating units, so that each seat maintains an equal predetermined pitch, while the total number of seats remains equal in comparison to the conventional seating arrangment.

Also, more comfort is provided by offset or staggering of seat cushions and backrests in seating units by only an exact predetermined slight distance of between 2-8 cm., but preferably 5 cm.

When arranging the offset beyond the 2-8 cm. range, many of the advantages have been found to disappear and certain disadvantages to appear.

Several surveys and tests with various groups of people indicated the 5 cm. offset to be the most advantageous, resulting for each passenger in improved unrestricted comfort in elbowroom, knee-spreading room and shoulder room.

The present invention offers a new approach to seating units construction and in compartment arrangement which will provide the passenger with the psychological feeling of increased well-being and of more privacy and the physical aspect of more room and comfort.

By staggering the seats in a unit by just a few centimeters, each passenger is moved to a different plane and the area of movement of the body, the arms and legs do not interfere with the next passenger, since each passenger's elbows, shoulders, knees, and feet project into an unoccupied area.

A further advantage of the present invention in the arrangement of the seating in the seating unit is that the first and second passenger next to the window are both able to look through the window with almost equal comfort. The present invention provides individual elbow room, shoulder room and leg room while retaining the equal pitch to each seat and yet providing individual privacy as desired.

Because the preferred off-set is only a few centimeters, neither the conversation aspect between passengers is affected nor the access between seats.

Compared to conventional seating units, the present invention requires certain structural changes. The changes offset adjacent seats a predetermined distance, where 2 cm. is the minimum and 8 cm., the maximum. Beyond this range the advantages are not realized and other disadvantages occur, such as seat protrusions, which hinder a person's access between units, uncomfortable conversation positions, etc.

The most preferred embodiment of the present invention is visible in a three-seat seating where: (a) the center seat cushion and backrest is 5 cm. forward of the seat and backrests on either side, (b) the armrests are not staggered, and (c) the forward and rearward seating units are identically arranged, so that the seat pitch remains unchanged for each seat in a row of units.

Further advantages will be apparent in the detailed description disclosed hereinafter.

DESCRIPTION OF THE DRAWINGS

FIG. 5 is an isometric illustration of the conventional base structure of a prior art seating unit as illustrated in FIG. 2.

FIG. 6 is an isometric illustration of an example of the base structure of a seating unit of the invention as shown in FIG. 4.

FIGS. 7-14 are plan views of alternate seating arrangements following the principles of the example of the preferred embodiment as shown in FIG. 4.

DESCRIPTION AND OPERATION OF THE INVENTION

It has heretofore been standard in the transportation industry that passengers have been arranged in a system 10 of rows of seats disposed in a compartment at each side next to the windows 12 (not shown).

Figure 1:
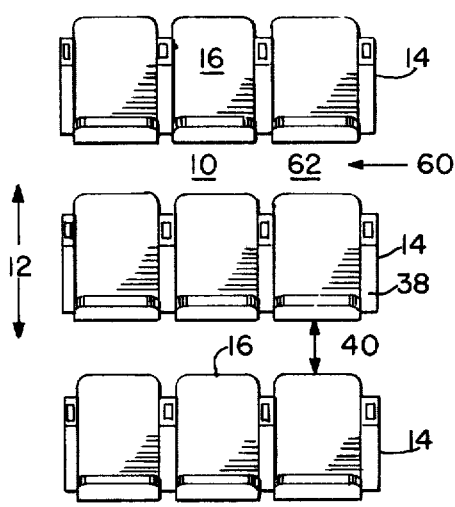
FIG. 1 is a plan view of a section of a row of prior art of passenger seats.

A typical prior art seating arrangement of three-seat units 14 is illustrated in FIG. 1.

Figure 2:
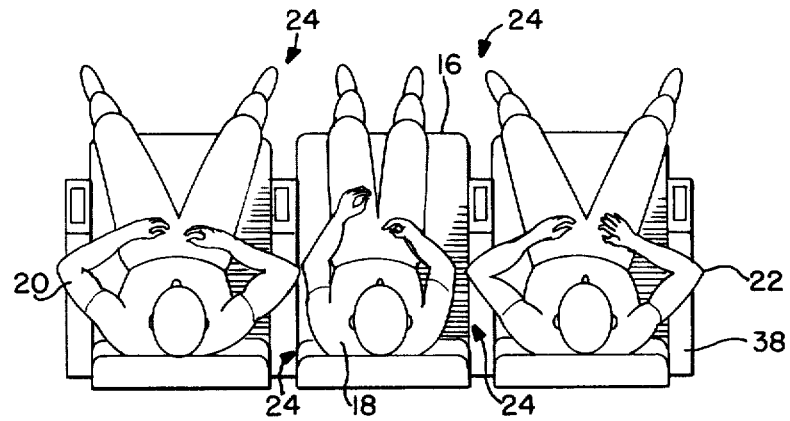
FIG. 2 is a plan view of one multiple seating unit as arranged in FIG. 1 and wherein the unit is occupied by passengers.

As indicated in FIG. 2, the unlucky passenger 18 in a center seat 16 may experience a very inconvenient, irritable, uncomfortable trip, in particular when adjacent passengers 20 and 22 are unconcerned about their co-passenger 18. But even when concerned, well-behaving passengers who are occupying a seating unit have limited areas of displacement (see arrows 24) in knee, leg, and feet and shoulder, arm, elbowroom and may unconsciously be occupying the next passenger's 18 territory.

The problem has been recognized but has heretofore been solved only in "first class" seating approaches where, at great expenditure of overall space, a passenger is given more room in an attempt to provide for his comfort.

Figure 4:
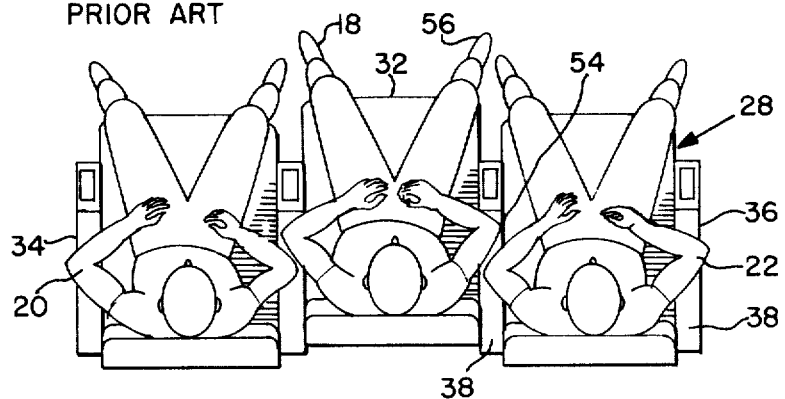
FIG. 4 is a plan view of an example of one seating unit of the present invention as arranged in FIG. 3 wherein the unit is occupied by passengers.

The present invention, however, as illustrated in the example of FIG. 4, relates to a seating unit 28 structure where one seat 32 is mounted at a forward offset position with respect to the other seats 34 and 36. The offset is within a definite distance range and the position of the armrests 38 remains unchanged.

In order to accommodate the forward offset of seat 32, the disposition of the seating unit 28 is similarly altered forwardly since the same minimum pitch 40 for each individual seat has to be maintained. This results in a new staggered system of seating units for passenger compartments; and, of course, it should be realized that in, for example, an aircraft of 250-500 seats, the configuration of seating throughout the entire vehicle will be in the same fashion as shown in the partial arrangement illustrated in FIG. 3.

It will be evident, when comparing FIG. 4 to FIG. 2 that the person 18 occupying the center seat 32 in the three-seating unit 28 can expand his elbows 54 without colliding with the window passenger 20 and aisle passenger 22. Also, his feet, leg and knees 56 have more room for expanding sideways, because these protrusion points of the adjacent passengers are displaced for and aft with respect to each other.

It will further be evident that the center person 18 may be timidly squeezed in FIG. 2; and this could also happen to a window passenger as soon as the center passenger occupies the window passenger's 20 right armrest.

In FIG. 2 and FIG. 4 only average sized persons are illustrated; and they are indicated as being disposed in relatively optimum positions. However, when large people are involved they may shift from such optimum positions; then the problem of passenger comfort may become greatly aggravated.

In the seating unit 28 more privacy or, if desired, better conversation ability between adjacent passengers is provided. For a family with children or babies, the child in the center seat 32 is better watched or, when placed in the window seat 36, causes less interference.

Referring to FIG. 1, when viewing from the aisle direction (see arrow 60) into the access area 62, it creates a psychological feeling of (a) a bench to be shared, (b) losing freedom and privacy, etc. In comparison, when entering from the aisle 70, the offset areas 72 and 74 create in the passenger the impression of looking at your own private space, an area somewhat bordered (as shown in dashed line fashion) where privacy, and freedom and, most important, comfort is available.

It will be evident that a view toward the center aisle or toward the window is essentially unlimited to two passengers since the center passenger has an enhanced view in either direction.

Since the seats in airplanes and buses are designed for comfort and safety, the seating unit has a seat which includes a backrest 80, a seat cushion 82 and armrests 38 at both sides of the seat (see FIG. 7).

Referring to FIG. 6, the prior art backrest 80 is generally pivoted at point 84. The new offset seat structure 90 includes individual pivot points 86 and an offset frame arrangement as suggested for examnple in FIG. 6.

As stated, the preferred and thoroughly tested offset arrangement of seats is approximately 5 cm. If the offset is less than 2 cm., the advantages disappear and the disadvantages of the prior art return, and when it surpasses 8 cm., too much privacy exists and claustrophobia takes over while access becomes difficult.

As stated, the armrests 38 may remain at the same location as in the prior art arrangements and aid in providing a roomy and systematic, well organized layout. As noted, the small rectangle 100 may indicate an ashtray or a control panel area, which normally protrudes sideways towards the passenger.

The rectangle 100 only indicates that such items as ashtray, light switches, air switches, radio or movie plug-in, etc. are located in the same area and do not interfere.

Figure 3:
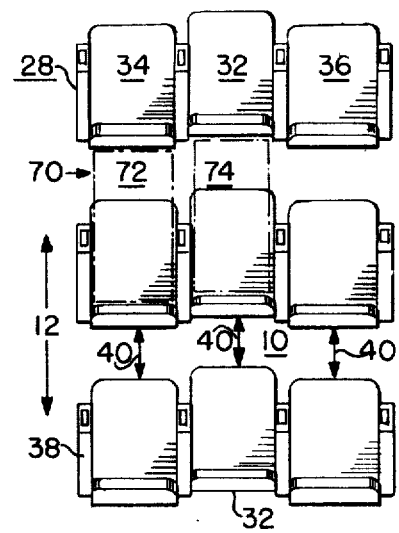
FIG. 3 is a plan view of a section of a row of seats constructed in accordance with the principles of the present invention.

The preferred configuration of the present invention is illustrated in FIGS. 3 and 4; however, it is obvious that various modifications for seating unit 55 of two, three or more seats are possible, as long as the offset remains identical as shown in FIGS. 7-14, within a predetermined distance in the range of 2-8 cm., but preferably is 5 cm.

Instead of staggering the seats in an alternate mode, FIGS. 8 and 9 teach a standard version, which would have appeal for sightseeing vehicles or the like.

FIG. 14 relates to a center row configuration which may have appeal in jumbo aircraft.

Now therefor I claim:

1. An improvement to conventional aircraft seating unit arrangement and construction for eliminating physical interference of shoulders and elbows between adjacent passengers comprising, in combination:
   (a) a base structure for carrying a plurality of substantially identical seats;
   (b) each of said seats mounted on said base structure in adjacent parallel and offset relationship to one another;
   (c) said offset relationship being a measurement within a range of 2-8 cm;
   (d) each of said seats including a seat cushion and a pivotal backrest; and
   (e) three or more substantially identical armrest means of equal size mounted in parallel and aligned relationship to one another, and wherein each one of said armrest means is mounted on said base structure at each side of each of said seats whereby passengers are located in said offset relationship and shoulders of adjacent passengers are in juxtaposed nonoverlapping relationship and elbows of adjacent passengers are adjacently positioned on said armrest means between said adjacent seats in a noninterfering relationship.

2. An improved seating arrangement in aircraft compartments for providing comfort to passengers by eliminating physical interference of shoulders and elbows between adjacent passengers comprising, in combination:
   (a) a plurality of rows of seating units wherein each of said seating units is mounted one after another;
   (b) each of said seating units having a base structure for carrying a plurality of substantially identical seats;
   (c) each of said seats mounted on said base structure in adjacent parallel and offset relationship to one another;
   (d) said offset relationship being a measurement within a range of 2-8 cm;
   (e) each of said seats including a seat cushion and a pivotal backrest; and
   (f) three or more substantially identical armrest means of equal size mounted in parallel and aligned relationship to one another, and wherein each of said armrest means is mounted on said base structure at each side of each of said seats whereby passengers are located in said offset relationship and shoulders of adjacent passengers are in juxtaposed nonoverlapping relationship and elbows of adjacent passengers are adjacently positioned on said armrest between said adjacent seats in a noninterfering relationship.

* * * * *